(Model.)　　　　　　　　　　　　　　　　　　　　2 Sheets—Sheet 2.
A. C. FARNSWORTH & C. E. ROBERTS.
JOURNAL BEARING.
No. 527,016.　　　　　　　　　　　　　Patented Oct. 2, 1894.
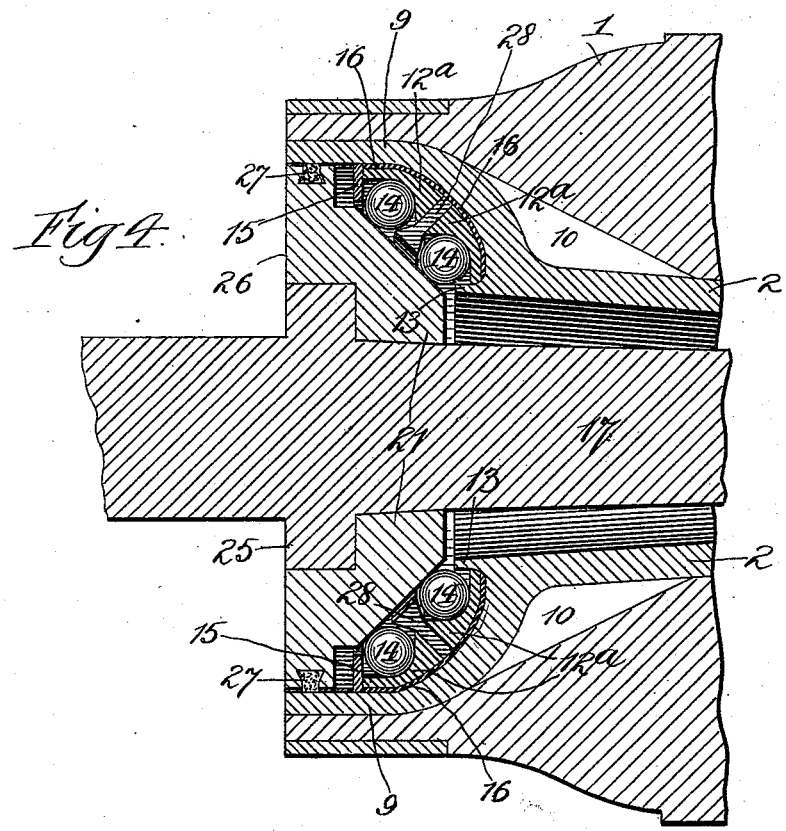
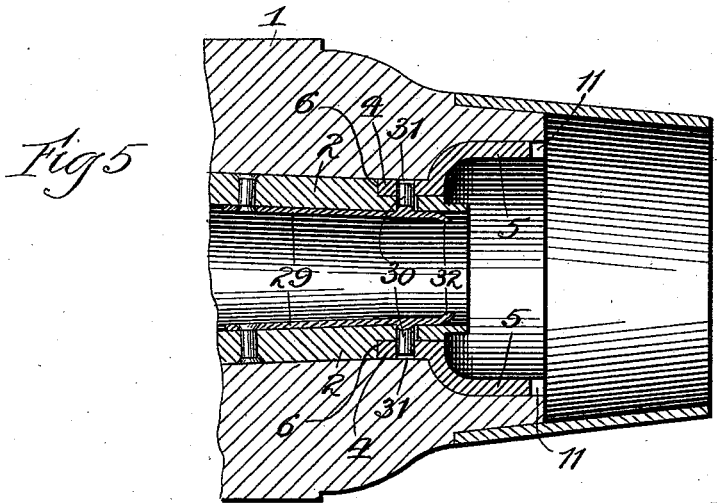
Witnesses　　　　　　　　　　　　　　　　　Inventors.
　　　　　　　　　　　　　　　　　　　　　A. C. Farnsworth,
　　　　　　　　　　　　　　　　　　　　　C. E. Roberts,
　　　　　　　　　　　　　　　by Elliott & Hopkins Attys

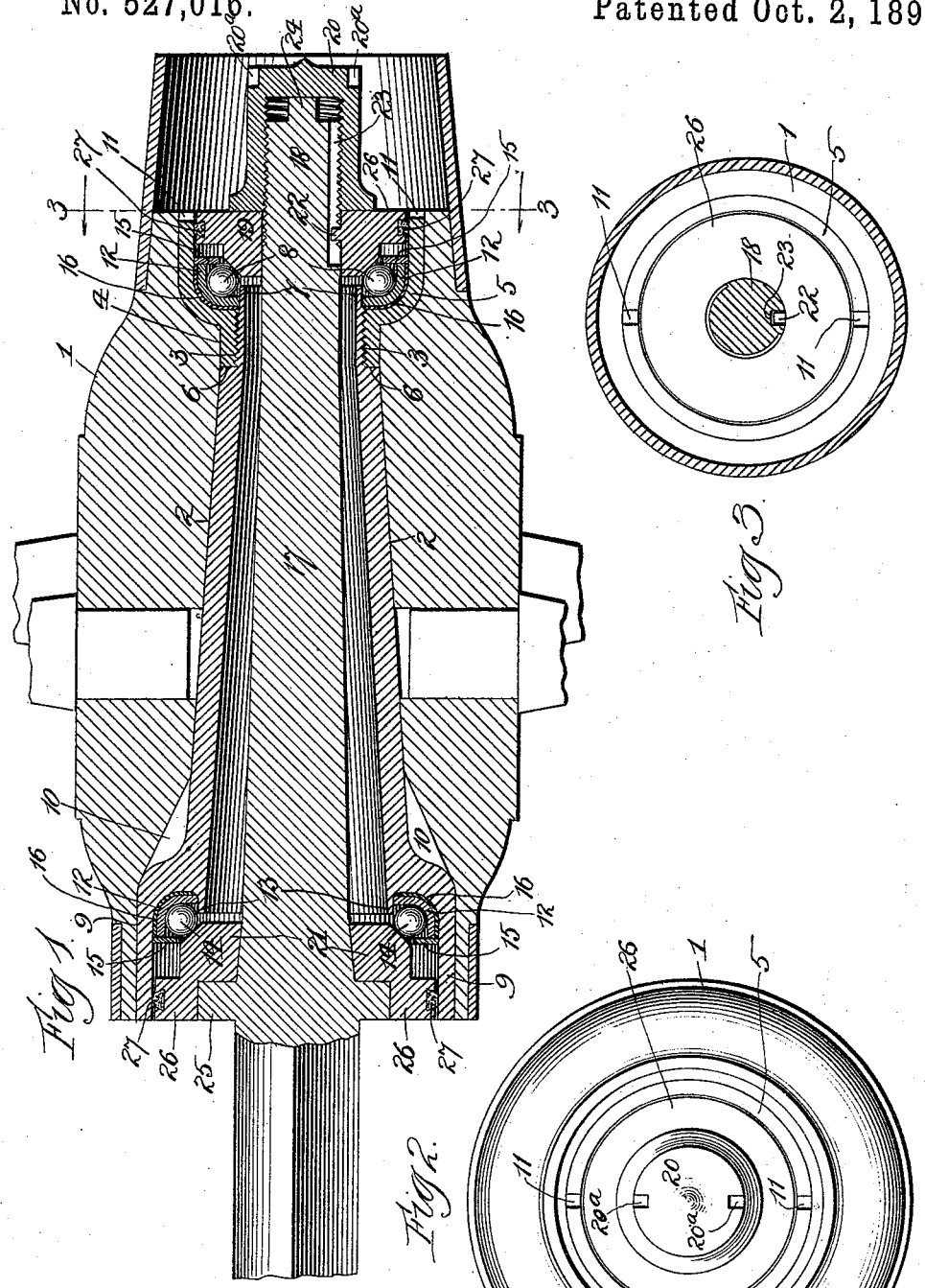

UNITED STATES PATENT OFFICE.

ANDREW C. FARNSWORTH, OF CHICAGO, AND CHARLES E. ROBERTS, OF OAK PARK, ILLINOIS; SAID ROBERTS ASSIGNOR TO SAID FARNSWORTH.

JOURNAL-BEARING.

SPECIFICATION forming part of Letters Patent No. 527,016, dated October 2, 1894.

Application filed March 12, 1894. Serial No. 503,309. (Model.)

*To all whom it may concern:*

Be it known that we, ANDREW C. FARNSWORTH, residing at Chicago, and CHARLES E. ROBERTS, residing at Oak Park, county of Cook, State of Illinois, citizens of the United States, have invented certain new and useful Improvements in Journal-Bearings, of which the following is a full, clear, and exact specification.

Our invention relates to improvements in journal bearings generally, in which anti-friction devices such as balls, cones or rollers are interposed between the wearing parts; but is more particularly designed for use in connection with the journals or axles of vehicles, and it is shown in the accompanying drawings as applied to the hub and axle of an ordinary carriage or buggy wheel.

The improvements have more especial reference to features of construction in the means for holding the shells for the anti-friction balls, in the hub and also to the means for holding such balls in their said shells, and providing the same with proper bearing surfaces.

The improvements relate further to the provision of proper bearings for the balls on the axle or journal, and to means for taking up wear and guarding against undue tightening of the bearings; and our improvements relate still further to means for relieving the shock on the bearing surfaces and means for excluding the dust from the shells and relieving the shock between such shells and the axle.

One of the objects of our invention is to tighten the bearings by the direct pressure of the cap nut and to provide improved means for limiting the inward movement of such nut, which may not be tampered with and will not work loose or produce torsional strain on the threads of the nut or the axle; and a still further object is to provide an improved form of cushion in the line of shock between the balls and their shells, whereby danger of breakage of the anti-friction devices will be avoided.

With these ends in view our invention consists in certain features of novelty hereinafter more fully described with reference to the accompanying drawings, and particularly pointed out in the claims.

In the said drawings, Figure 1 is a longitudinal section of a hub and axle provided with our improvements. Fig. 2 is an end view thereof. Fig. 3 is a transverse section taken on the line 3—3 Fig. 1. Fig. 4 is an enlarged detail view of the inner end of the hub and other parts in section illustrating certain modifications hereinafter described, and Fig. 5 is a detail sectional view of the outer end of the hub illustrating modified means for securing the removable shell in place.

Like signs of reference indicate like parts in all the views.

In applying our improvements to an ordinary carriage or buggy wheel, the hub 1 is provided with the ordinary bore or central passage which heretofore served for the reception of the ordinary axle box, excepting that in our invention such bore is made conical or tapering and it is enlarged at each end for the reception of the shells for the balls or anti-friction devices as will be described further on. Within this bore is arranged the axle box 2 which is also conical, tapering from its rear to its forward or outer end and terminating at the latter end in a reduced portion 3 on the exterior of which are formed screw threads for the engagement of an interiorly threaded neck 4 projecting inwardly from the outer shell 5. This outer shell 5 is considerably larger than the smaller end of the box 2 as shown, and it fits in the outer one of the recesses in the end of the hub, which is complementary in shape to the shell. The peripheries of the neck 4 and the box 2 are flush or coincident as shown and the box is provided with a shoulder 6 against which the end of the neck 4 firmly abuts when screwed into place, and thus checks the turning of the shell and prevents injury to the threads while at the same time forming a stop gaging the protrusion of a flange 7 formed on the extreme end of the threaded portion 3, and constituting means for holding the balls 8 in place on one side.

The rear or inner end of the box 2 is provided with a shell 9 which is considerably larger in diameter than the shell 5 and is preferably formed integrally with the box. This shell 9 is likewise let into a complementary recess in the rear end of the hub and under normal conditions its outer edge is flush with the end of the hub. The box at some convenient point, such for instance as at the juncture of the shell 9 and the end of the box, is provided with a pair of fins or feathers 10 which engage in complementary counter-sinks formed in the hub so as to prevent the box from turning within the hub when the shell 5 is being turned-up on its threaded end. The bore in the hub and the axle box being conical in form, such box may be readily inserted almost to the limit of its movement within the box without the aid of special means. When so inserted the feathers 10 will engage in their counter-sinks and then by inserting the shell 5, bringing its threaded neck into engagement with the threaded end of the box, and then turning up the shell by means of a suitable wrench applied in the sockets 11 formed in the outer end of the shell, the axle box may be forced home or drawn into the hub with any desired degree of pressure. In the event it should become loose it would only be necessary to remove the end shell and dress off the inner end of the neck 4 so as to permit the shell to be screwed farther onto the box and thus pull the box farther into the bore.

Arranged at the inner end of each of the shells is a steel or other suitable race 12 whose outer surface is approximately circular and forms a seat for the balls 8. These races are annular in form so that the one in the outer shell 5 will surround the projection 7 on the axle box while the one in the rear shell 9 will surround a similar projection 13 formed on the end of the box and serving to hold the rear balls 13 from displacement on one side, while at the same time the projections 7—13 serve to hold the races in place in the event they should crack. Each of the races 12 is held against outward movement when the hub is off the axle, by means of a ring 15 jammed into the shell and bearing against the race as shown. This ring is of sufficient width to also project partly over the balls and thus, in conjunction with the projections 7—13, hold the balls against displacement when the wheel is off.

In devices of this nature considerable inconvenience and difficulty have been experienced by the breakage of the balls and cones due to the severe shock to which they are subjected while the vehicle is passing over rough roads or cobbled streets. In order that this shock may be deadened and the liability of the breakage of the balls reduced to the minimum, we interpose at some suitable point in the line of shock between the balls and the hub, a suitable cushion consisting of rubber or other equivalent material. This cushion may be best interposed between the shell and the race 12 as indicated at 16 so as to be held in place by the race and permit the latter to yield slightly with reference to the shell and being thus interposed directly between the race and the shell, the race will be better able to yield to the shock than if located between the shell and the hub. The races being separate from the shells they will be capable of independent movement both with reference to each other and to the shells. The rubber cushions 16, which are in the form of annular gaskets, are arranged around the projections or flanges 7—13, respectively, and are thus prevented from oozing out between the parts when compressed. The gaskets are confined at their outer edges by means of the retaining rings 15.

The end of the axle 17 is provided with a threaded portion 18 as usual; but in our invention this threaded portion is the same in diameter as the adjoining portion of the axle so that the formation of the usual shoulder against which the cap-nut ordinarily abuts, is avoided. The purpose of having these parts of equal diameter is to permit the bearing cone 19 to be readily inserted over the threaded portion and onto the plain portion of the axle without obstruction.

The bearing cone 19 is held up to its work against the balls 8 and the hub forced onto the axle with the balls 14 in firm engagement with the inner bearing cone 21, by means of the cap nut 20, which bears directly against the outer face of the cone 19. The cone 19 however is sleeved loosely upon the axle and is prevented from rotation with the balls by means of a lug 22 engaging in a groove 23 formed in the end of the axle. In order that the bearings may not be too severely tightened by the nut 20 and at the same time the nut may be screwed up with sufficient force to prevent it from turning off, we provide the extreme end of the axle with a nib 24 against which the end of the nut abuts. This nib 24 is so proportioned in length that when the inner end of the nut comes in contact with it the cones will be adjusted to their proper position; but in order that further movement of the nut may be accomplished, for taking up lost motion resulting from the bearings wearing away, the nib is considerably reduced in diameter so that by a stroke of the file the length of the nib may be reduced and the nut permitted to move farther inward. The nib 24 should be of reduced diameter for the further reason that a projection of considerable cross area could not be reduced in length evenly all over and consequently the nut when screwed on would be subjected to torsional strain, resulting in injury to the threads; and this is of considerable importance because the threads are very fine and easily injured, it being desirable to make them fine and of slight pitch so that the nut which is preferably made round may be readily turned-up with sufficient force to prevent its working loose, without marring or defacing the outer surface of the nut. The nib 24 is also located directly in the center of the axle so as to avoid the torsional strain before referred to. By the employment of this nib 24 formed integrally with the axle it will be seen that the movement of the nut in either direction cannot alter its adjustment as is the case with the adjustable screw heretofore employed. Neither can it result in torsional strain on the nut as is the case with the eccentrically-located screw heretofore employed, nor is it a device which would be tampered with by ignorant persons, yet the adjustment of the nut may be readily and accurately effected by this means.

The axle is provided with the usual flange 25 at its rear end, and the rear cone 21 instead of being simply rested against this flange as heretofore, is provided with a recess into which the flange is seated, the cone being shrunk on the axle and over the flange with its face flush with the flange and also with the end of the hub and shell 9. An advantage in having these surfaces flush as described is that dust and mud will have less opportunity of collecting on the axle and finding their way up over the edge of the cone 21 and into the bearings.

Each of the cones 19—21 is provided with a flange 26 which fits within its shell, with a slight space between it and the latter; and in the periphery of each of these flanges is formed a dove-tailed groove into which is forced a cushion 27 which bears against the inner surface of the shell and constitutes at once means for deadening the shock between the shell and the flange and excluding dust and grit from the bearings. A further purpose of these cushion packings 27 is to completely stop up the ends of the axle box so as to prevent the escape of oil or other lubricant which may fill the various spaces within the box and shells, it being understood that the cone 21 being shrunk upon the axle and the nut 20 being firmly forced against the cone 19 which is also snugly fitted upon the axle, such lubricant cannot escape *via* these parts between them and the axle.

Referring now to Fig. 4 which illustrates our invention adapted for the employment of a double row of balls in each of the shells, as is sometimes desirable on heavy vehicles or on vehicles used largely on rough roadways, it will be seen that we employ a double race, or two races 12ª, the face of each being so curved as to hold its respective set of balls substantially in its center and away from the other set. In order that the inner set of balls may have means on their outer sides for holding them in place and the outer set of balls may have means on their inner sides for holding them in place, we interpose between the two races a retaining ring 28 which is held in place by the two races, it being understood that the general shape of the ring 28 is conical and hence its inner edge cannot be disengaged from the space between the races without removing the outer race. The outer edge of the ring 28 is provided with salient sides or edges as clearly shown so as to partially overlap the balls in each set on their inner sides, thus holding the inner set of balls in place on one side while the flange 13 holds them in place on the other side, and the outer set of balls in place on their inner side while the ring 15, heretofore described, holds the outer race in place and also holds the outer set of balls in place on their outer sides. In the drawings we have shown the double set of balls as applied to the rear or inner end of the hub, but it will of course be understood that the same construction may be applied to the outer end as well.

In the modified means of holding the outer shell in place, shown in Fig. 5, we may, if desired, do away with the threads on the reduced portion 3 as the same are liable to injury, but it should be understood nevertheless that the latch or catch which we will now describe for holding the outer shell on the end of the axle box may be employed as supplementary to the threads on the reduced portion 3, for preventing retrograde movement of the shell which is liable to result from the severe agitation or jarring to which the hub is subjected. In the drawings however, we have shown the reduced portion 3 without the threads and the neck 4 of the shell simply slipped thereover and abutting against the shoulder 6. Secured to the inner side of the axle box 2 is a spring 29 having a lug or pin 30 passing through the reduced portion 3 and engaging in a socket or perforation 31 formed in each side of the neck 4, thus holding the shell 5 from being pulled off until the springs 29 are deflected inward sufficiently to withdraw the pins 30. This may be conveniently accomplished by providing the springs 29 with inturned ends 32 over which any suitable instrument may be inserted for forcing the springs toward each other.

It is of course understood that the whole strain resulting from the weight of the buggy or vehicle is borne by the cones 19—21, and as these are inclined inwardly it follows that such strain has a tendency to force the shells toward each other and hence the shell 5 is continually held against the substantial shoulder 6 on the end of the box 2.

Having thus described our invention, what we claim as new therein, and desire to secure by Letters Patent, is—

1. The combination with the axle and a hub having a conical bore chambered at each end and provided with countersinks or notches in one end, of a conical axle box having its smaller end threaded, a fixed shell on the larger end of said box, a removable shell threaded on the smaller end of said box and adapted to draw the box home in the hub, fins or feathers fitting in said notches for preventing the box from turning with said removable shell, whereby the box may be tightened up in the hub at will, anti-friction balls and cones arranged in said shells and supporting the hub upon the axle, the end of said box being provided with a dressed flange projecting into said shell and retaining said balls on one side, and also with a rigid shoulder for limiting the extent of protrusion of said dressed flange, and means for retaining said balls on the other side, substantially as set forth.

2. The combination with a hub having anti-friction balls arranged therein, of an axle having a threaded end terminating in a reduced centrally located integral rigid nib, a bearing cone, and a cap-nut bearing against both said nib and cone, the threaded portion of said axle extending inward beyond the nut whereby the latter may be turned farther on by reducing the length of the nib, substantially as set forth.

3. The combination with a hub having anti-friction balls arranged therein, of an axle having a threaded end terminating in a reduced centrally located integral rigid nib, a bearing cone and a cap-nut bearing at the inner side of its head or cap against said nib and at its inner end against said cone, the threaded portion of said axle being of the same diameter as the adjoining portion of the axle whereby the cone will not hang thereon and the nut may be turned farther on for tightening the cone when the length of the nib is reduced, substantially as set forth.

4. The combination with a hub, the axle box having a shell and anti-friction balls therein, of the axle having a flange flush with the inner end of said hub, and a bearing cone shrunk over said flange and axle and being flush with the outer side of said flange, substantially as set forth.

5. The combination with a hub, an axle box having a shell, an axle, a cone thereon, of balls in said shell resting on said cone, a steel race for said balls fitting removably in said shell, and a removable ring crowded in said shell and holding said race and balls in place, substantially as set forth.

6. The combination with a hub having a shell, and the axle, of anti friction devices supporting the hub upon said axle, a race secured in said shell for said anti friction devices, and a cushion confined between said race and shell, substantially as set forth.

7. The combination with a hub, an axle and a bearing cone, of a shell secured within said hub, a number of races arranged within said shell, balls arranged between said races and cone, a ring interposed between and being held in place by said races, for holding the balls in place on one side, and means for holding said balls in place on their other sides, substantially as set forth.

8. The combination with a hub, an axle and a bearing cone or collar, of a number of races secured within said hub, anti friction balls arranged between said races and cone or collar, and a ring interposed between and held in place by said races and having salient edges for holding said balls in place on one side, and means for holding said balls in place on their other sides, substantially as set forth.

9. The combination with a hub, an axle and a bearing cone or collar, of a number of races secured within said hub and having their inner adjacent corners beveled or cut away, balls arranged between said races and cone or collar, a ring arranged between said races and having one edge complementary in shape to their said beveled or cut away corners and its other edge projecting between the balls and having salient edges for holding the balls in place on their inner sides, and means for holding the balls in place on their outer sides, substantially as set forth.

10. The combination with a hub, an axle and a bearing cone or collar, of a shell secured within said hub and provided at one side with a flange 13, a race arranged within said shell and surrounding said flange, a second race arranged adjacent to said first race, balls interposed between said races, a ring arranged between, and held in place by said races and having its outer edge projecting over the balls for holding them in place, and a ring 15 for holding the outer one of said races in place and having a projecting edge for holding the outer balls in place, substantially as set forth.

11. The combination with a hub and an axle, of an axle box arranged within said hub and having a shell on one end adapted to fit in one end of the hub and the other end of said box being provided with a shoulder 6, a removable shell fitting on the latter end of said box and abutting against said shoulder 6 and having a socket or perforation, a detachable latch or catch secured to said box and engaging in said socket or perforation, and anti friction devices in said shells for supporting the hub upon the axle, substantially as set forth.

12. The combination with a hub and an axle, of an axle box arranged within said hub and having a reduced end provided with a shoulder 6, a shell having a neck fitting on said end and abutting against said shoulder, a pair of spring latches or catches secured within said box and passing into said neck for securing the neck and box together, and anti friction devices arranged within said shell for supporting the hub upon the axle, substantially as set forth.

13. The combination with a hub and an axle and bearing cones thereon, of an axle box in said hub provided with a cup-shaped shell at each end, and the ends of said box being provided with the flanges 7—13 projecting into said shells, respectively, an annular removable race arranged in each of said shells and surrounding said flanges, respectively, so as to be held in place by the latter in the event the races break, anti-friction balls arranged in said races and the retaining rings 15 crowded into said shells against said races and each being of sufficient width to retain both the races and the balls in place, substantially as set forth.

14. The combination with a hub and an axle and bearing cones thereon, of an axle box in said hub provided with a cup-shaped shell at each end, and the ends of said box being provided with the flanges 7—13 projecting into said shells, respectively, an annular removable race arranged in each of said shells and surrounding said flanges, respectively, so as to be held in place by the latter in the event the races break, anti-friction balls arranged in said races, rubber cushions arranged around said flanges 7—13, between the races and the shells and the retaining rings 15 crowded into said shells against said races and cushions and being of sufficient width to project over said cushions, rings and balls for retaining them in place, substantially as set forth.

ANDREW C. FARNSWORTH.
C. E. ROBERTS.

Witnesses:
F. A. HOPKINS,
EDNA B. JOHNSON.